June 12, 1923.

L. T. COLLIN

CORNSTALK LIFTER

Filed Dec. 28, 1920

Inventor
Louis T. Collin

By

Attorney

June 12, 1923.
L. T. COLLIN
CORNSTALK LIFTER
Filed Dec. 28, 1920
1,458,875
2 Sheets-Sheet 2
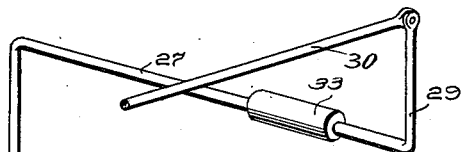
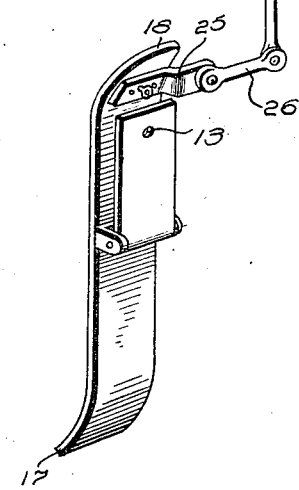
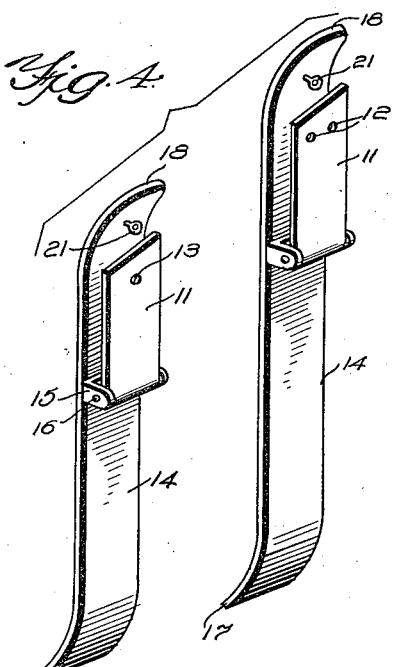
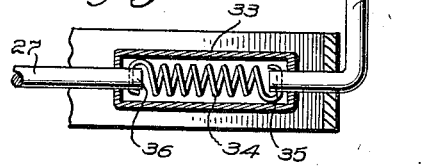
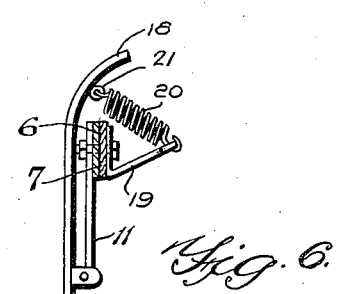
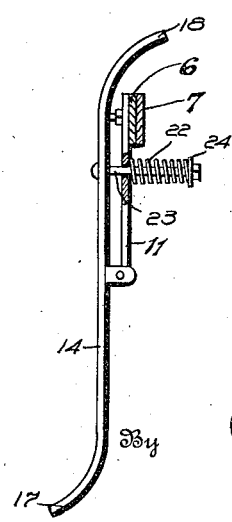
Inventor
Louis T. Collin
By
Attorney Patented June 12, 1923.

1,458,875

UNITED STATES PATENT OFFICE.

LOUIS T. COLLIN, OF SACRED HEART, MINNESOTA.

CORNSTALK LIFTER.

Application filed December 28, 1920. Serial No. 433,568.

*To all whom it may concern:*

Be it known that I, LOUIS T. COLLIN, a citizen of the United States, residing at Sacred Heart, in the county of Renville and State of Minnesota, have invented certain new and useful Improvements in Cornstalk Lifters, of which the following is a specification.

This invention relates to corn stalk lifters, and more particularly to means for raising lodged corn stalks.

In the present invention, I have provided an attachment for agricultural implements for the purpose of clearing the lodged corn stalks betwen rows of corn. The device may be attached to any type of implement used in corn fields, and is particularly useful in connection with corn pickers. By raising or lifting the corn stalks, the gathering chains of the corn picker can more readily engage the stalk and force it into the snapping rolls of the picker.

The pivoted tines arranged on the frame of the corn stalk lifter are adapted to swing in a plane substantially parallel to the side of the implement and the supporting members are arranged to swing in a plane at right angles to the plane of the tines. In operation, the tine nearest the implement to which the corn stalk lifter is attached first engages the stalk and lifts it. As the implement is moved forwardly, the next tine engages the stalk and lifts it farther until it finally is engaged by the last tine and lifted clear of the wheels.

In the accompanying drawings, I have shown several embodiments of the invention. In this showing:

Figure 3 is a detail perspective view of controlling means for one of the tines, Figure 4 is a detail perspective view of a pair of tines, Figure 5 is a sectional view on line 5—5 of Figure 2.

Figure 6 is a sectional view on line 6—6 of Figure 2, and,

Figure 7 is a detail view showing a slightly different construction.

Figure 1:
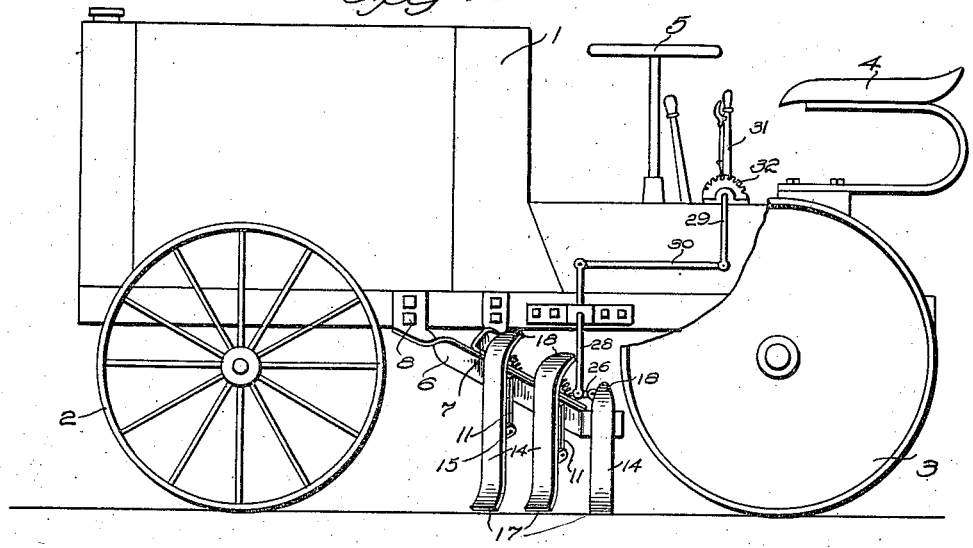
Figure 1 is a side elevation of a tractor, showing the invention applied.

Referring to the drawings, the reference numeral 1 designates generally a tractor having front wheels 2 and rear wheels 3. An operator's seat 4 is arranged on the tractor and a steering wheel 5 is provided. The construction heretofore described is the usual construction, and forms no part of the present invention, except in the combination claimed.

Figure 2:
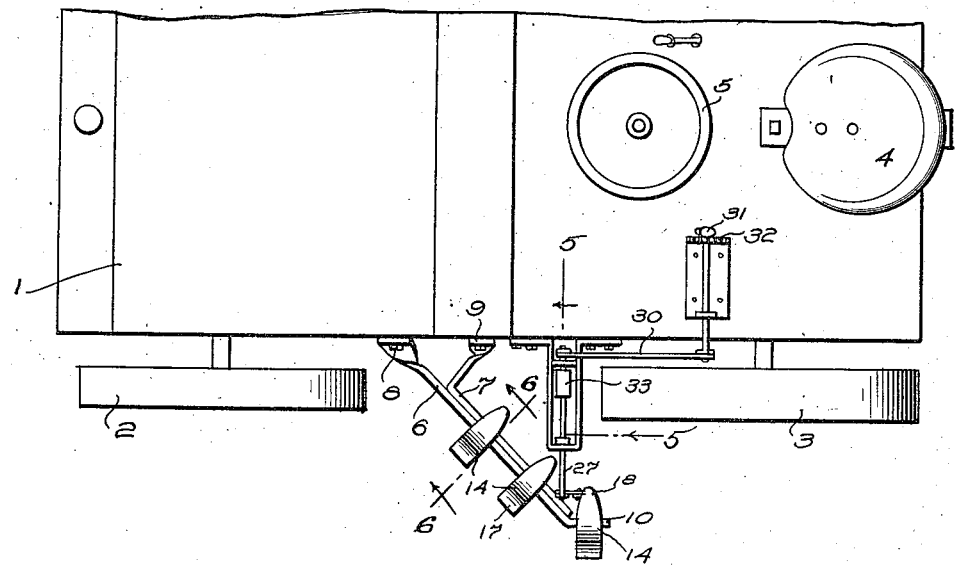
Figure 2 is a plan view of one side of the tractor showing the invention applied.

The frame of the corn stalk lifter is arranged on one side of the implement between the front and rear wheels. As shown, it comprises a pair of straps or members 6 and 7, secured to the frame, as at 8 and 9. The tractor extends outwardly and downwardly from the implement, at an angle, to a point beyond the wheels, (see Figure 2) and is then continued rearwardly in a substantially horizontal plane, as at 10.

A plurality of supporting members 11 are secured to the frame of the corn stalk lifter, the inner member being provided with a plurality of openings 12 for the reception of bolts whereby it is rigidly secured to the frame (see Figure 4). All of the supporting members except the inner supporting member, are pivotally secured to swing in a plane substantially parallel to the plane of the frame. The outer supporting member is controlled by suitable levers, and the inner supporting members are pivotally supported and normally held in vertical position by means of springs or other suitable mechanism. As shown, the supporting members, with the exception of the inner supporting member are each provided with a single opening 13 (see Figures 3 and 4) for the reception of a bolt or other fastening means, passing through the supporting member and the frame 6—7, whereby the supporting member is pivotally supported. Tines 14 are pivotally mounted on the supporting members and are adapted to swing in a plane at right angles to the supporting members. As shown, each of the tines is provided with a pivot member 15 having ears arranged at each side for the reception of a pivot pin 16, which passes through an enlargement formed in the supporting member. The lower ends of the tines are curved outwardly, as at 17, to assist in engaging the corn stalks, and the upper ends are curved inwardly, as at 18, to prevent the stalk from being caught between the tine and the supporting member.

Referring to Figures 6 and 7 of the drawings, means are provided for normally maintaining the supporting members and tines in vertical position. As shown in Figure 6 of the drawings, a bracket 19 is arranged on the back of the frame of the corn stalk lifter and a coil spring 20 is secured to this bracket. The other end of the spring is received in an eye 21, arranged on the tine. The construction permits the tine to give when it strikes an obstacle, such as a rock, and to assume its normal position after the obstacle has been passed. The spring 20 also maintains the supporting member in vertical position when the tine is in engagement with the corn stalk.

In the form shown in Figure 7 of the drawings, the tine is normally maintained in proper position by means of a spring 22, surrounding a bolt 23, which is secured to the tine and extends through an opening in the supporting member. A washer 24 engages the outer end of the spring, the inner end being in engagement with the rear face of the supporting member.

The outer tine is provided with means whereby it may be controlled by the operator of the machine. As shown, it is provided with a plate 25 to which is secured a link 26, the link being secured to a lever 27 having a downwardly extending arm 28, and an upwardly extending arm 29. The arm 29 is secured to a connecting link 30 which is suitably connected to an operating lever 31, arranged near the operator's seat, and provided with a quadrant 32, whereby the lever may be arranged in any desired position.

The lever 27 is provided with means for normally maintaining the outer tine in normal position, or in any adjusted position. As shown (see Figure 5), the lever passes through a casing 33, in which is arranged a coil spring 34, the lever being separated and connected to the ends of the spring, as at 35 and 36. It will be apparent that when the lever 31 is adjusted to maintain the tine at any desired angle, and the tine strikes an obstacle which moves it from its adjusted position, the spring 34 will be placed under tension by the movement of the tine, and will return the tine to its adjusted position when the obstacle has been passed.

In operation, when the corn stalk lifter is attached to a vehicle, and the vehicle passes along the rows in a corn field, any corn stalks that have become lodged or beaten down will be engaged, first by the inner tine and raised. The supporting member of this tine is rigidly mounted whereby the tine is always maintained at the same distance from the frame of the machine. As the vehicle travels, the stalk will be engaged by each of the tines in succession, until it is finally engaged by the outer tine, which is arranged in a plane substantially parallel to the side of the vehicle, and clear of the rear wheel. The stalk will thus be prevented from passing under the rear wheel and being beaten down. When the corn stalk lifter is used in connection with a corn picker, each row of stalks will thus be raised or lifted immediately before the picking operaton, and the engagement with the picking mechanism will be facilitated.

It is to be understood that the forms of my invention herewith shown and described are to be taken as preferred examples of the same, and that various changes in the shape, size, and arrangement of parts may be resorted to without departing from the spirit of the invention or the scope of the subjoined claims.

Having thus described my invention, I claim:

1. The combination with a vehicle of a corn stalk lifter comprising a frame adapted to be secured to the side of the vehicle, supporting members arranged thereon, the inner supporting member being rigidly secured to said frame, the other supporting members being pivotally secured to said frame, and tines pivotally mounted on said supporting members.

2. The combination with a vehicle of a corn stalk lifter comprising a frame adapted to be secured to the side of the vehicle, supporting members arranged thereon, tines pivotally mounted on said supporting members, and control means secured to the outer tine, said control means comprising a link, a lever connected thereto, and an operating lever arranged on the agricultural implement.

3. The combination with a vehicle of a corn stalk lifter comprising a frame adapted to be secured to the side of the vehicle, supporting members arranged thereon, tines pivotally mounted on said supporting members, and springs secured to said tines and adapted to normally maintain them in vertical position.

4. The combination with a vehicle of a corn stalk lifter comprising a frame extending outwardly and downwardly, the outer end of said frame being substantially horizontal and substantially parallel to the side of the vehicle a plurality of supporting members arranged on said frame, the outer supporting member being arranged on the outer end of said frame, the inner supporting member being rigidly secured to the frame, the outer supporting member and intermediate supporting members being pivotally secured thereto, tines pivotally mounted on said supporting members, springs for normally maintaining said supporting members and said tines in substantially vertical positon, and mechancal means for controlling the position of the tine supported on the outer supporting member.

In testimony whereof I affix my signature. in the presence of two witnesses.

LOUIS T. COLLIN.

Witnesses:
G. P. MANGERUD,
HENRY COLLIN.